(12) United States Patent
Choi et al.

(10) Patent No.: US 9,952,684 B2
(45) Date of Patent: Apr. 24, 2018

(54) INPUT APPARATUS, POINTING APPARATUS, METHOD FOR DISPLAYING POINTER, AND RECORDABLE MEDIUM

(71) Applicant: SAMSUNG ELECTRONICS CO., LTD., Suwon-si (KR)

(72) Inventors: Eun-seok Choi, Anyang-si (KR); Byung-seok Soh, Yongin-si (KR); Ho-june Yoo, Seoul (KR); Sang-on Choi, Suwon-si (KR)

(73) Assignee: SAMSUNG ELECTRONICS CO., LTD., Suwon-Si (KR)

( * ) Notice: Subject to any disclaimer, the term of this patent is extended or adjusted under 35 U.S.C. 154(b) by 0 days.

(21) Appl. No.: 14/273,131

(22) Filed: May 8, 2014

(65) Prior Publication Data

US 2014/0333534 A1 Nov. 13, 2014

Related U.S. Application Data

(60) Provisional application No. 61/821,398, filed on May 9, 2013.

(30) Foreign Application Priority Data

Aug. 26, 2013 (KR) ........................ 10-2013-0101210

(51) Int. Cl.
*G06F 3/033* (2013.01)
*G06F 3/0346* (2013.01)
(Continued)

(52) U.S. Cl.
CPC ............ *G06F 3/033* (2013.01); *G06F 3/0346* (2013.01); *G06F 1/1694* (2013.01); *G06F 3/017* (2013.01);
(Continued)

(58) Field of Classification Search
CPC combination set(s) only.
See application file for complete search history.

(56) References Cited

U.S. PATENT DOCUMENTS 5,835,078 A 11/1998 Arita et al.
5,923,307 A 7/1999 Hogle, IV
(Continued)

FOREIGN PATENT DOCUMENTS

JP 2006-11558 A 1/2006
JP 2013-16051 A 1/2013
(Continued)

OTHER PUBLICATIONS

Communication dated May 23, 2014, issued by the Korean Intellectual Property Office in Korean Application No. 10-2013-0101210.
(Continued)

*Primary Examiner* — Jennifer Mehmood
*Assistant Examiner* — Sosina Abebe
(74) *Attorney, Agent, or Firm* — Sughrue Mion, PLLC

(57) ABSTRACT

An input apparatus is provided. The input apparatus includes a communicator configured to receive a signal from a pointing apparatus, and a controller configured to control to display the pointer on a first position of the display when a start signal is received from the pointing apparatus, and when sensed position information of the pointing apparatus is received from the pointing apparatus, the controller controls to display the pointer on a second position of the display, which corresponds to the received position information of the pointing apparatus.

23 Claims, 11 Drawing Sheets

(51) Int. Cl.
  *G06F 3/038* (2013.01)
  *G06F 3/023* (2006.01)
  *G06F 3/03* (2006.01)
  *G06F 3/01* (2006.01)
  *G06F 1/16* (2006.01)

(52) U.S. Cl.
  CPC .......... *G06F 3/0236* (2013.01); *G06F 3/0304* (2013.01); *G06F 3/038* (2013.01); *G06F 3/0383* (2013.01)

(56) References Cited

U.S. PATENT DOCUMENTS

| | | | |
|---|---|---|---|
| 6,271,806 B1 | 8/2001 | Motoshima et al. | |
| 6,342,873 B1 | 1/2002 | Ueoka et al. | |
| 6,342,878 B1 | 1/2002 | Chevassus et al. | |
| 7,542,028 B2 | 6/2009 | Suzuki | |
| 7,978,172 B2 | 7/2011 | Fujita | |
| 8,032,324 B1 | 10/2011 | Bryant et al. | |
| 8,436,813 B2 | 5/2013 | Yoo et al. | |
| 8,462,011 B2 | 6/2013 | Yun | |
| 8,614,672 B2 | 12/2013 | Ohta et al. | |
| 8,988,311 B2 | 3/2015 | Kitashou | |
| 9,703,444 B2 | 7/2017 | Nicholson et al. | |
| 2003/0071832 A1 | 4/2003 | Branson | |
| 2003/0128187 A1* | 7/2003 | Strubbe | G06F 3/0304 345/157 |
| 2004/0070564 A1* | 4/2004 | Dawson | H04N 21/422 345/156 |
| 2005/0168399 A1 | 8/2005 | Palmquist | |
| 2005/0225453 A1* | 10/2005 | Chang et al. | 340/825.69 |
| 2006/0033712 A1 | 2/2006 | Baudisch et al. | |
| 2006/0152489 A1 | 7/2006 | Sweetser et al. | |
| 2006/0197744 A1 | 9/2006 | Tiphane et al. | |
| 2007/0060228 A1 | 3/2007 | Akasaka et al. | |
| 2007/0229467 A1 | 10/2007 | Sakai et al. | |
| 2008/0125223 A1 | 5/2008 | Ohta | |
| 2008/0132339 A1 | 6/2008 | Taira | |
| 2009/0009471 A1 | 1/2009 | Yamamoto et al. | |
| 2009/0066646 A1 | 3/2009 | Choi et al. | |
| 2009/0072992 A1 | 3/2009 | Yun | |
| 2009/0184922 A1 | 7/2009 | Lou | |
| 2009/0309808 A1 | 12/2009 | Swingler | |
| 2010/0039383 A1 | 2/2010 | Kadoi | |
| 2010/0053164 A1 | 3/2010 | Imai et al. | |
| 2010/0144283 A1 | 6/2010 | Curcio et al. | |
| 2010/0225582 A1 | 9/2010 | Ohta et al. | |
| 2010/0265175 A1 | 10/2010 | Kabasawa et al. | |
| 2010/0277420 A1 | 11/2010 | Charlier et al. | |
| 2010/0309121 A1 | 12/2010 | Huang et al. | |
| 2010/0313143 A1 | 12/2010 | Jung et al. | |
| 2010/0315331 A1 | 12/2010 | Cheng et al. | |
| 2011/0029917 A1 | 2/2011 | Um | |
| 2011/0109526 A1 | 5/2011 | Bauza et al. | |
| 2011/0169734 A1 | 7/2011 | Cho et al. | |
| 2011/0199298 A1* | 8/2011 | Bassompiere et al. | 345/157 |
| 2011/0199300 A1 | 8/2011 | Yoo et al. | |
| 2011/0227825 A1 | 9/2011 | Liberty et al. | |
| 2011/0267425 A1* | 11/2011 | Kim | H04N 13/0497 348/43 |
| 2011/0285623 A1 | 11/2011 | Ye et al. | |
| 2012/0032929 A1 | 2/2012 | Cho | |
| 2012/0038549 A1 | 2/2012 | Mandella et al. | |
| 2012/0062442 A1 | 3/2012 | Locker et al. | |
| 2012/0119992 A1 | 5/2012 | Nishida et al. | |
| 2012/0194427 A1 | 8/2012 | Lee et al. | |
| 2012/0242596 A1 | 9/2012 | Sip | |
| 2012/0256966 A1 | 10/2012 | Kira et al. | |
| 2012/0280898 A1 | 11/2012 | Lucero et al. | |
| 2013/0083240 A1 | 4/2013 | Kerr et al. | |
| 2013/0138726 A1* | 5/2013 | Shin | H04L 29/08 709/203 |
| 2013/0181899 A1 | 6/2013 | Yun | |
| 2013/0176255 A1 | 7/2013 | Kim et al. | |
| 2013/0234940 A1 | 9/2013 | Hsieh et al. | |
| 2013/0241801 A1 | 9/2013 | Petrik et al. | |
| 2013/0265487 A1 | 10/2013 | Yu et al. | |
| 2013/0278482 A1 | 10/2013 | Hsu | |
| 2013/0300885 A1 | 11/2013 | Huang et al. | |
| 2014/0009366 A1 | 1/2014 | Chang | |
| 2014/0028726 A1 | 1/2014 | Dave et al. | |
| 2014/0104139 A1 | 4/2014 | Buchner | |
| 2014/0194066 A1 | 7/2014 | Li | |
| 2014/0316543 A1 | 10/2014 | Sharma et al. | |

FOREIGN PATENT DOCUMENTS

| | | |
|---|---|---|
| KR | 10-2003-0067863 A | 8/2003 |
| KR | 10-2009-0030163 A | 3/2009 |
| KR | 10-2011-0039318 A | 4/2011 |
| KR | 10-2012-0096129 A | 8/2012 |
| KR | 10-2014-0133385 A | 11/2014 |
| WO | 2004/031934 A1 | 4/2004 |
| WO | 2007/007227 A2 | 1/2007 |

OTHER PUBLICATIONS

Communication dated Oct. 13, 2014 issued by Korean Intellectual Property Office in counterpart Korean Patent Application No. 10-2014-0111049.
Communication dated Oct. 2, 2014 issued by European Patent Office in counterpart European Patent Application No. 14167606.4.
Search Report dated Jun. 22, 2015 issued by the International Searching Authority in counterpart International Patent Application No. PCT/KR2015/003288 (PCT/ISA/210).
Written Opinion dated Jun. 22, 2015 issued by the International Searching Authority in counterpart International Patent Application No. PCT/KR2015/003288 (PCT/ISA/237).
Communication dated Jun. 8, 2015 issued by the European Patent Office in counterpart European Patent Application No. 15162849.2.
Communication dated Sep. 28, 2016, issued by the United States Patent and Trademark Office in counterpart U.S. Appl. No. 14/681,813.
Communication dated May 5, 2017 by the United States Patent and Trademark Office in counterpart U.S. Appl. No. 14/681,813.
Baudisch, Patrick et al., "Halo: a Technique for Visualizing Off-Screen Locations", CHI 2003, Apr. 5-10, 2003, pp. 481-488, vol. 5, No. 1, Ft. Lauderdale, Florida.
Anonymous, "The Pocket TV: Makes any TV a Smart TV", Infinitec-Kickstarter, May 30, 2012, pp. 1-14, XP055421801, Retrieved from the Internet: URL: https://www.kickstarter.com/projects/484889112/the-pocket-tv-makes-any-tv-a-smart-tv [retrieved Nov. 3, 2017].
Communication issued by the United States Patent and Trademark Office dated Aug. 24, 2017 in counterpart U.S. Appl. No. 14/681,813.
Communication issued by the European Patent Office dated Nov. 13, 2017 in counterpart European Patent Application No. 14167606.4.
Communication dated Feb. 8, 2018, issued by the United States Patent and Trademark Office in counterpart U.S. Appl. No. 14/681,813.

* cited by examiner

INPUT APPARATUS, POINTING APPARATUS, METHOD FOR DISPLAYING POINTER, AND RECORDABLE MEDIUM

CROSS-REFERENCE TO RELATED APPLICATIONS

This application claims priority from U.S. Provisional Application No. 61/821,398 filed on May 9, 2013 in the United States Patent and Trademark Office, and from Korean Patent Application No. 10-2013-0101210 filed on Aug. 26, 2013 in the Korean Intellectual Property Office, the disclosures of which are incorporated herein by reference in their entireties.

BACKGROUND

1. Field

Apparatuses and method consistent with exemplary embodiments generally relate to a pointing apparatus, and more particularly, to an input apparatus having higher visibility as compared with a laser pointer in the related art, a pointing apparatus, a method for displaying a pointer, and a recordable medium.

2. Description of the Related Art

In order to display an image outputted from a personal computer (PC) on a large-scale screen, a method of projecting an image to a screen by using a beam projector has been commonly used. However, the beam projector is not capable of providing high brightness and resolution, which causes problems that a user is not able to clearly see an image under bright lights, and the displayed image is not clear. For this reason, a display apparatus such as a Liquid Crystal Display (LCD) is perceived as a replacement of the beam projector since such display apparatuses provide high brightness and resolution. Since it has become possible to manufacture large-scale display apparatuses at lower costs with the improvement of display-related technologies, it is expected that production of such large-scale display apparatuses will increase even more.

Meanwhile, a pointer for indicating a certain part of a displayed image is commonly used along with the beam projector. In the related art, a laser pointer which emits a laser light has been used. A user is able to focus on a desired part by directing a laser light of the laser pointer at a desired point on a screen which is projected by the beam projector. Recently, a laser pointer which provides a simple image control function, such as a function of converting pages of a presentation material, is being developed.

However, as the beam projector has been replaced with a display apparatus, a problem that the visibility of a laser pointer is decreased has occurred when the laser pointer is used along with a display apparatus. That is, a screen of a display apparatus reflects a laser light of a laser pointer, and an image on the display apparatus has the brightness which is equal to or higher than the brightness of the laser light, which can result in problems when using a laser pointer.

In this regard, a pointing method which may replace a laser pointer in the related art and which provides high visibility even on a display apparatus having high brightness is necessary.

SUMMARY OF THE INVENTION

The present disclosure has been provided to address the aforementioned and other problems and disadvantages occurring in the related art, and an aspect of the present disclosure provides a pointing method providing high visibility even on a display apparatus having high brightness.

An input apparatus according to an exemplary embodiment includes a communicator configured to receive a signal from a pointing apparatus, and a controller configured to control to display the pointer on a first position of the display when a start signal is received from the pointing apparatus, and when sensed position information on the pointing apparatus is received from the pointing apparatus, the controller controls to display the pointer on a second position of the display, which corresponds to the received position information of the pointing apparatus.

When the sensed position information of the pointing apparatus is received at a time when the start signal is received from the pointing apparatus, the controller may control to display the pointer on the second position of the display, which corresponds to the received position information of the pointing apparatus.

The first position may be a center position of the display.

The sensed position information on the pointing apparatus may be calculated according to an absolute pointing method.

The controller may control to display a mouse pointer independently from the pointer based on a signal received from a mouse input apparatus.

In addition, when the pointing apparatus does not move for a predetermined time, the controller may control the pointer displayed on the display to disappear.

In addition, when a select signal is received from the pointing apparatus while the pointer is located on an object displayed on the display after a mode convert signal is received from the pointing apparatus, the controller may control to select the object.

The controller may control to display a plurality of pointers of a plurality of pointing apparatuses independently according to signals received from the plurality of pointing apparatuses.

The controller may control to display the plurality of pointers distinctively from each other.

A pointing apparatus according to an exemplary embodiment includes a communicator configured to communicate with an input apparatus, an input receiver configured to receive a user input for starting a pointing input, a sensor configured to sense position information of the pointing apparatus when the user input is received, and a controller configured to transmit the user input and the sensed position information to the input apparatus.

The sensor may include at least one from among an acceleration sensor, an angular velocity sensor, and a geomagnetic sensor to sense absolute position information on the pointing apparatus.

The input unit may include a first button configured to input a mode convert input and a second button configured to control the input apparatus. In addition, when a user command for mode convert input is received by manipulation of the first button, the controller may control to convert an input mode of the pointing apparatus in response to the received user command to a different input mode, and when a user command for controlling the input apparatus is received by manipulation of the second button, the controller may control to generate and transmit a control signal for controlling the input apparatus according to the different input mode.

When the input mode is a presentation mode, and the user command for controlling the input apparatus is received by the manipulation of the second button, the controller may control to generate a control signal for changing a page of a displayed screen and transmit the control signal to the input apparatus.

When the different input mode is a mouse mode, and the user command for controlling the input apparatus is received by the manipulation of the second button, the controller may control to generate a control signal for selecting a displayed object and transmit the control signal to the input apparatus.

In addition, when a user command is not received through the input receiver for a predetermined time, and changed position information of the pointing apparatus is not sensed through the sensor, the controller may convert a status of the pointing apparatus to a sleep status by selectively cutting off power supply to internal components of the pointing apparatus.

In addition, when a user command is received through the input receiver or the changed position information of the pointing apparatus is sensed through the sensor in the sleep status, the controller may convert a status of the pointing apparatus to a wake up status by applying power to the internal components of the pointing apparatus.

A method for displaying a pointer according to an exemplary embodiment, the method includes receiving a start signal from a pointing apparatus, displaying a pointer on a first position of a display according to the received start signal, and when sensed position information of the pointing apparatus is received from the pointing apparatus, displaying the pointer of a second position of the display, which corresponds to the received position information on the pointing apparatus.

The displaying the pointer on a second position of the display may include, when the sensed position information of the pointing apparatus is received at a time when the start signal is received from the pointing apparatus, displaying the pointer on the second position of the display, which corresponds to the received position information of the pointing apparatus.

A pointing method according to another exemplary embodiment includes receiving a user input for starting a pointing input, sensing position information of the pointing apparatus when the user input is received, and transmitting the user input and the sensed position information to an input apparatus.

A recordable medium according to an exemplary embodiment may be a non-transitory recordable medium including a program for executing the method for displaying a pointer.

According to yet another exemplary embodiment, the input apparatus may include a display configured to display the pointer according to the received signal.

Also, the first position may be a predetermined position.

According to yet another exemplary embodiment, a system comprising the input apparatus and pointing apparatus as described above, is provided.

BRIEF DESCRIPTION OF THE DRAWINGS

The above and/or other aspects of the present inventive concept will be more apparent by describing certain exemplary embodiments of the present inventive concept with reference to the accompanying drawings, in which.

DETAILED DESCRIPTION

Figure 1:
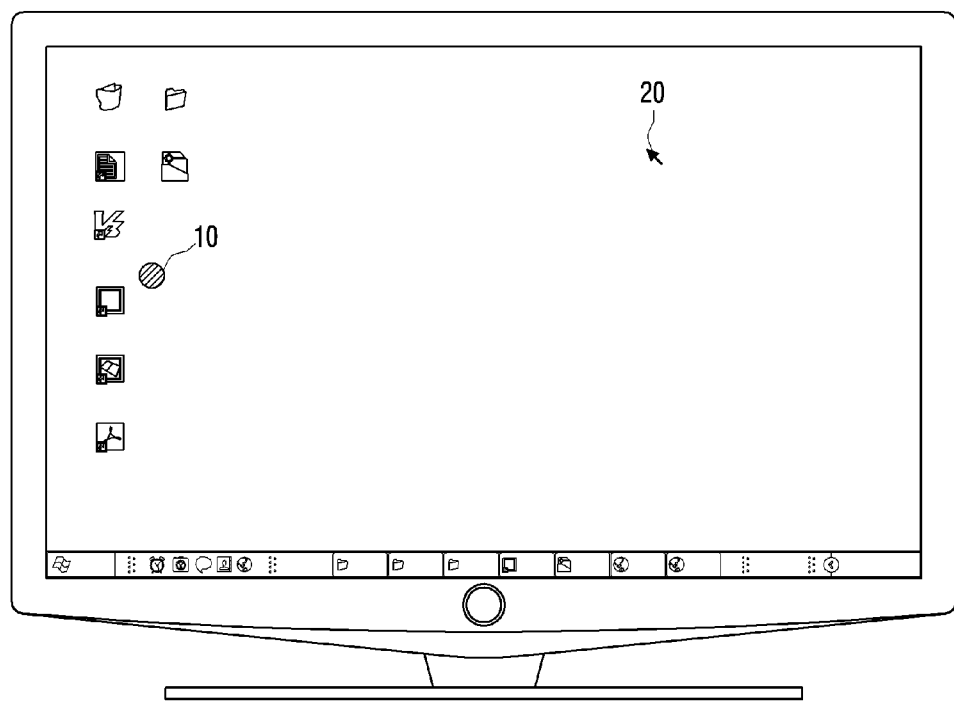
FIG. 1 is a schematic diagram illustrating a screen of displaying a pointer according to an exemplary embodiment.

Certain exemplary embodiments are described in greater detail below with reference to the accompanying drawings.

In the following description, like drawing reference numerals are used for the like elements, even in different drawings. The matters defined in the description, such as detailed construction and elements, are provided to assist in a comprehensive understanding of exemplary embodiments. However, exemplary embodiments can be practiced without those specifically defined matters. Also, well-known functions or constructions are not described in detail since they would obscure the application with unnecessary detail.

FIG. 1 is a schematic diagram illustrating a screen of displaying a pointer according to an exemplary embodiment.

When a pointer is displayed on a screen of a display apparatus through a laser pointer, the visibility of the pointer is decreased since the brightness of an image which is displayed on the display apparatus is high and a surface of a panel of the display apparatus reflects a laser light of the laser pointer. In order to resolve such problem, a method of encoding a pointer to a displayed image and outputting the pointer may be considered.

That is, the aforementioned method refers to a method of outputting a pointer 10 which is distinct from a mouse pointer 20 as illustrated in FIG. 1. The method is characterized by outputting a pointer on a position of a screen, which corresponds to a spatial movement through the mouse pointer 20 and a wireless pointing device. In this case, the pointer 10 is outputted along with an image, and has a distinctive color or shape, and thus, provides high visibility. In addition, the pointer 10 is distinguished from the mouse pointer 20, and thus, depends solely on a movement of a pointing apparatus without being affected by a movement of a mouse. Thus, the pointer 10 does not cause any confusion in use which may occur due to the movement of a mouse. That is, the pointer of the present disclosure may be called as a virtual pointer since the pointer indicates an object by being outputted on a screen rather than indicating an object by an actual light as the laser pointer in the related art. Hereinafter, methods related to the virtual pointer are described in further detail.

Figure 2:
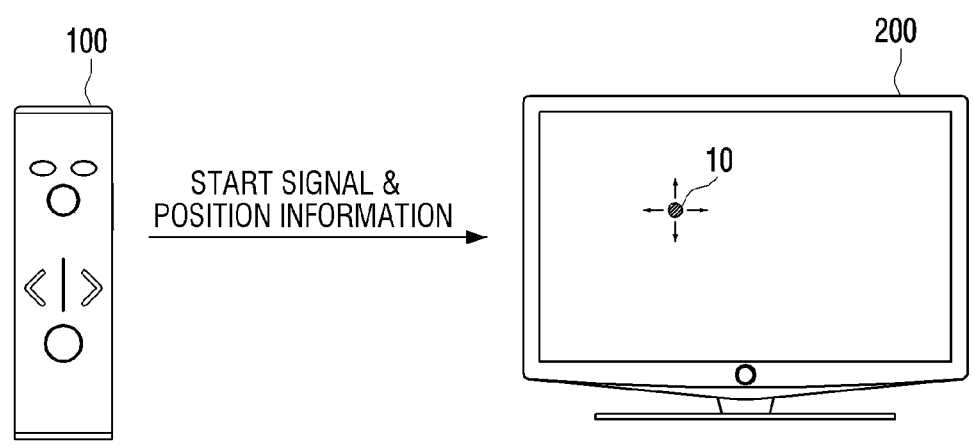
FIG. 2 is a schematic diagram illustrating a pointing system according to an exemplary embodiment.

FIG. 2 is a schematic diagram illustrating a pointing system according to an exemplary embodiment.

As illustrated in FIG. 2, a pointing system according to an exemplary embodiment includes a pointing apparatus 100 and an input apparatus 200.

The pointing apparatus 100 is a configuration which receives a user input, senses movement information, and transmits the user input and the sensed movement information to the input apparatus 200. The pointing apparatus 100 may also generate a pointer command corresponding to the received user input and movement information and transmit the pointer command to the input apparatus 200.

In particular, the pointing apparatus 100 transmits a start signal for starting a pointing operation, and the input apparatus 200 receives the start signal and displays the pointer 10 on a screen. When the pointing operation is started, the pointing apparatus 100 senses a movement, that is, position information, and transmits the sensed position information to the input apparatus 200. The input apparatus 200 displays the pointer 10 on a corresponding position on the screen according to the position information on the pointing apparatus 100.

Hereinafter, a specific configuration and operations of each apparatus are described. The input apparatus 200 is described first.

Figure 3:
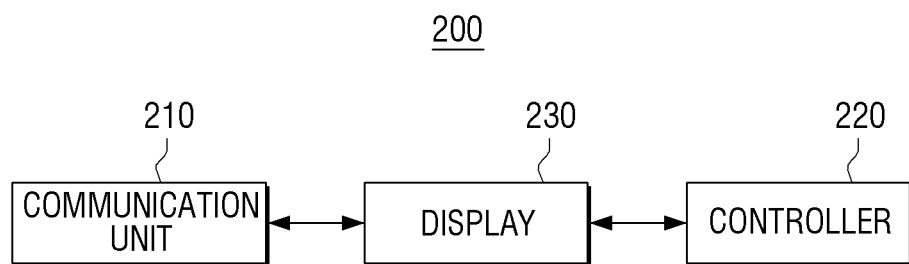
FIG. 3 is a block diagram illustrating a structure of an input apparatus according to an exemplary embodiment.

FIG. 3 is a block diagram illustrating a structure of an input apparatus according to an exemplary embodiment.

Referring to FIG. 3, the input apparatus 200 according to an exemplary embodiment includes a communication unit 210 (i.e., communicator), a display 220, and a controller 230.

The communication unit 210 is a configuration which receives a signal from the pointing apparatus 100. To be specific, the communication unit 210 receives a start signal which notifies that a pointing operation is started and position information on the pointing apparatus 100 from the pointing apparatus 100. Alternatively, the communication unit 210 may receive a pointing command signal according to the position information. The communication unit 210 transmits the received signal to the controller 230.

The communication unit 210 may be implemented as various communication methods. In general, the communication unit 210 includes a near field communication module. For example, the communication unit 210 may be implemented as at least one of the near field communication methods such as Wi-Fi, Wideband CDMA (WCDMA), High Speed Downlink Packet Access (HSDPA), High Speed Uplink Packet Access (HSUPA), High Speed Packet Access (HSPA), mobile WiMAX, WiBro, Long Term Evolution (LTE), a Bluetooth module, Infrared Data Association (IrDA), Near Field Communication (NFC), Zigbee, and wireless Local Area Network (LAN).

The display 220 is a configuration which displays an image including a pointer. To be specific, the display 220 displays a pointer according to the received signal. In addition, the display 220 may display the pointer for a mouse separately as described below.

The display 220 may be designed as various display panels. That is, the display panel 220 may be implemented as various display methods such as Organic Light Emitting Diodes (OLED), a LCD panel, a Plasma Display Panel (PDP), a Vacuum Fluorescent Display (VFD), a Field Emission Display (FED), Electro Luminescence Display (ELD), etc. The display panel is commonly configured as an emitting type, but does not exclude a reflecting type display (E-ink, P-ink, and Photonic Crystal). In addition, the display panel may be implemented as a flexible display, a transparent display, and the like.

The controller 230 controls overall operations of the input apparatus 200. In particular, when a start signal is received from the pointing apparatus 100, the controller 230 controls to display a pointer on a first position on the display 220.

Herein, the first position may be a predetermined position on a display screen. For example, the first position may be a center position or a corner position of the display 220.

When the start signal is not received, the display 220 does not display the pointer on a screen. However, the display 220 may even display the pointer even at this time, i.e., when the start signal is not received. The start signal is deemed to represent an intention of displaying a pointer by using the pointing apparatus 100. Accordingly, when the start signal is received, the controller 230 controls the display 220 to display the pointer on a predetermined position on the screen.

Displaying the pointer on a predetermined position is an exemplary characteristic which distinguishes the pointer of the present disclosure from the conventional mouse pointer. When a pointing operation is interrupted by the rebooting of a computer and is resumed thereafter, the conventional mouse pointer does not continue the pointing operation on a new position since the mouse pointer is commonly connected with wire, and thus, the range where the mouse pointer moves around is obviously fixed and there is little possibility that the mouse pointer moves out of the range. However, a user having the pointing apparatus 100 may be located anywhere. For example, a user who is conducting a presentation on the front of a screen, may be located on a side of the screen. In this case, when a pointer is displayed based on an actual position of the pointing apparatus 100, the pointer may not be mapped with the screen. Thus, a reference point of the pointer needs to be set.

When the sensed position information of the pointing apparatus 100 is received from the pointing apparatus 100 after the start signal is received, the controller 230 controls to display the pointer at a second position of the display 220, which corresponds to the received position information of the pointing apparatus 100.

As described below, the pointing apparatus 100 senses a position of the pointing apparatus 100 on a three-dimensional (3D) space at a predetermined time interval. When the sensed position is changed, that is, when a motion sensing value of the pointing apparatus 100 becomes different from a previous sensing value, the pointing apparatus 100 transmits the newly sensed position information to the input apparatus 200.

The second position refers to a position on the display 220, which corresponds to the position information of the pointing apparatus 100. That is, the second position is a two-dimensional (2D) coordinate on a display screen, which is mapped with an actual 3D spatial coordinate. Accordingly, a vector value where the pointing apparatus 100 moves in a direction of the display 220 is not considered in general. However, according to whether the pointing apparatus 100 is moving forward or moving away, an exemplary embodiment of varying a size of the pointer may be implemented. That is, when the pointing apparatus 100 moves to be close to the input apparatus 200, the size of the displayed pointer may be increased, and when the pointing apparatus 100 moves to be apart from the input apparatus 200, the size of the pointer may be decreased.

The pointing apparatus 100 is an apparatus for displaying a pointer on a position in a pointing direction (the front part), and thus, the movement of a direction angle of the pointing apparatus 100 is considered. For example, it is assumed that the pointing apparatus 100 moves in a horizontal direction when the front part of the pointing apparatus 100 indicates the first position of the display 220, and then subsequently the front part of the pointing apparatus 100 indicates the second position of the display 220. In this case, the pointer should be displayed such that the pointer moves from the first position to the second position on the screen. However, in some cases, the pointing apparatus 100 may rotate on a certain point of the pointing apparatus without moving in the horizontal direction. According to an exemplary embodiment, when it is assumed that the front part of the pointing apparatus 100 gets to indicate the second position as a result of the rotation, the pointer should move, when the pointing apparatus 100 is rotated, from the first position to the second position as it does when the pointing apparatus 100 moves in the horizontal direction. That is, the movement of the pointer in both of the exemplary embodiments should be displayed similarly.

In addition, the controller 230 may display the pointer based on a combination result of the start signal and the position information on the pointing apparatus 100. As an example, the controller 230 may control to renew the display of the pointer only when new position information is received for a predetermined time after the start signal is received. As another example, the controller 230 may control to renew the display of the pointer only when the start signal and new position information are received at a time after the start signal is received. The latter belongs to a case where the pointing apparatus 100 is configured such that a user moves a pointer while pressing a control button of the pointing apparatus 100. In this case, when the control button is pressed, the start signal and the position information may be received at a same time. In addition, when the control button is released, the pointer disappears from the screen. The pointer may be configured to return to a predetermined position or to be fixed on the position.

As specified above, the pointer of the pointing apparatus 100 needs to be distinguished from the mouse pointer. In general, a mouse is an input apparatus for selecting a particular icon or item. Accordingly, the mouse operates in an organic relation with an Operating System (OS) of a computer, and the OS responds to the movement of the mouse pointer sensitively. For example, when a mouse moves during a presentation, the OS of a computer or an application closes the presentation screen or displays a different menu. By contrast, the movement of the pointer of the pointing apparatus 100 does not affect an item of the OS or application.

Further, the pointer of the pointing apparatus 100 is to indicate an object on a screen, and thus, needs to be displayed distinctively. That is, the pointer is to have a plurality of users watch a position where the pointer exists, and thus, the color and shape of the pointer need to be displayed distinctively. However, the mouse pointer is to select an object for execution, and does not need to be displayed distinctively as much as the pointer of the pointing apparatus 100.

That is, the pointer of the pointing apparatus 100 is distinct from the mouse pointer in terms of functions and operations, and thus, may be displayed along with the mouse pointer. However, hereinafter, an exemplary embodiment that the pointing apparatus 100 includes the functions of the mouse pointer will be described. In this case, one of both types of pointers may be displayed through mode conversion.

When the pointing apparatus 100 is configured to display a pointer by button manipulation of the pointing apparatus 100 only, the controller 230 no longer displays the pointer on a screen unless the button manipulation is performed. When the pointing apparatus 100 is configured to continuously display the pointer on the last position of the screen even though there is no button manipulation, the controller 230 may control the pointer displayed on the display 220 to disappear when the pointing apparatus 100 does not move for a predetermined time after the pointer is displayed on the screen.

In addition, a case of receiving signals from a plurality of pointing apparatuses 100 may be considered. In this case, the controller 230 may control to independently display a plurality of pointers of the plurality of pointing apparatuses 100 in response to the signals received from the plurality of pointing apparatuses 100. Hence, it becomes possible that several people at a meeting may respectively display a pointer of their own pointing apparatuses on a screen.

In this case, the plurality of pointers may be displayed distinctively from each other. That is, the plurality of points may be displayed to be distinguished from each other in terms of color, shape, etc. For example, a first pointer may be colored red, and a second pointer may be colored yellow.

Meanwhile, as described below, according to an exemplary embodiment, the pointing apparatus 100 may convert a mode through the mode conversion, that is, a presentation mode in which the aforesaid pointer is displayed and a mouse mode in which a mouse pointer is displayed.

Herein, when a select signal is received from the pointing apparatus 100 while the mouse pointer is located on an object displayed on the display 220 after a mode convert signal is received from the pointing apparatus 100, the controller 230 controls to select the object. The mouse pointer is a pointer for selecting an object, and thus, when a mode of the pointing apparatus 100 is converted to the mouse mode, the pointing apparatus 100 operates like a mouse.

Other than the above, the controller 230 controls the overall operations of the input apparatus 200. The controller 230 includes hardware configuration such as a Micro Processing Unit (MPU), a Central Processing Unit (CPU), cache memory, data bus, and like and software configuration such as an OS and an application which performs operations for a particular purpose. According to a system clock, a control command for each component for operating the input apparatus 200 is read from a memory, and an electrical signal is generated according to the read control command to operate each component of the hardware.

Hereinafter, a structure and operations of the pointing apparatus 100 will be described.

Figure 4:
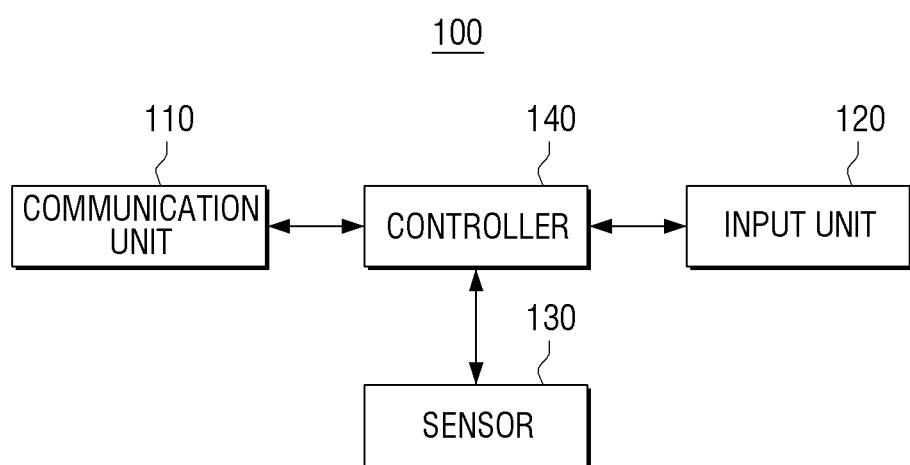
FIG. 4 is a block diagram illustrating a structure of a pointing apparatus according to an exemplary embodiment.

FIG. 4 is a block diagram illustrating a structure of a pointing apparatus according to an exemplary embodiment.

Referring to FIG. 4, the pointing apparatus 100 according to an exemplary embodiment includes a communication unit 110 (i.e., communicator), an input unit 120, a sensor 130, and a controller 140.

The communication unit 110 is a configuration which communicates with the input apparatus 200. To be specific, the communication unit 110 transmits a start signal of a pointing input to the input apparatus 200 or transmits the sensed position information on the pointing apparatus 100 to the input apparatus 200.

The communication unit 110 may be implemented according to various communication methods. In general, the communication unit 110 may include a near field communication module. For example, the communication unit 110 may be implemented according to various communication methods such as Wi-Fi, WCDMA, HSDPA, HSUPA, HSPA, mobile WiMAX, WiBro, LTE, a Bluetooth module, IrDA, NFC, Zigbee, wireless LAN, etc.

The input unit 120 is a configuration which receives a user input for starting the pointing input. To perform this operation, the input unit 120 may include one or more buttons. When a user manipulates a button, a signal for starting the pointing input may be generated, or a position of the pointing apparatus 100 may be sensed. The buttons may be designed as various forms such as a tact button, a touch button, a two-stage input button, a wheel, a switch button, etc.

The buttons may be distinguished according to functions. A center button is configured to generate a pointer on a predetermined position on a screen when it is pressed, and to move the pointer while being pressed. A direction button provides a function of moving a page when a presentation is performed. For example, a left direction button may be used in generating a control command of displaying a previous page, and a right direction button may be used in generating a control command of displaying a next page.

Meanwhile, when the pointing apparatus 100 supports the mode conversion, a mode convert button for performing conversion of an input mode is provided. The mode convert button may be designed according to a toggle method. In this case, when the mode convert button is pressed in the presentation mode, a mode of the pointing apparatus 100 may be converted to the mouse mode, and when the mode convert button is pressed in the mouse mode, the mode of the pointing apparatus 100 may be converted to the presentation mode.

In the mouse mode, the aforementioned functions of the direction buttons may vary. That is, in a center mode, the left direction button may perform the function of the right direction button, and the right direction button may perform the function of the left direction button. Accordingly, the direction buttons may be implemented so as to display a menu on a screen when the left direction button is manipulated, and to select an item that the pointer indicates when the right direction button is manipulated.

The sensor 130 is a configuration which senses the position information on the pointing apparatus 100. When a user input is received through the input unit 120, the sensor 130 may sense the position information on the pointing apparatus 100 at a predetermined time interval. The sensor 130 may include an acceleration sensor, an angular velocity sensor, and a geomagnetic sensor.

The acceleration sensor senses a variation of speed with respect to a unit time. The acceleration sensor may be implemented as a three-axis sensor. The three-axis sensor is equipped with an x-axis acceleration sensor, a y-axis acceleration sensor, and a z-axis acceleration sensor which are disposed in different directions and cross each other at right angles.

The acceleration sensor converts an output value of each of the x-axis, y-axis, and z-axis acceleration sensors into a digital value, and provides a preprocessor with the converted digital values. Herein, the preprocessor may include a chopping circuit, an amplifying circuit, a filter, and an analogue/digital converter (A/D converter). Hence, the preprocessor chops, amplifies, and filters an electrical signal outputted from the three-axis acceleration sensor, and converts the electrical signal to a digital voltage value.

The angular velocity sensor is a configuration which senses a variation of a predetermined direction of the pointing apparatus 100 for the unit time, thereby sensing an angular velocity. As the angular velocity sensor, a gyroscope having three axes may be employed.

Six axes of such inertial sensor may represent relative pointing. The pointing apparatus 100 may be implemented according to such relative pointing method. The relative pointing method relates to an apparatus where there is no direct mapping between a pointing apparatus and a screen. That is, the apparatus may sense a start point and a current position of the pointing apparatus 100 by using only an inertial sensor, and display the movement of a pointer on a screen by mapping the position variation.

Alternatively, the pointing apparatus 100 may be implemented according to an absolute pointing method by further using a geomagnetic sensor and the like. The geomagnetic sensor is a sensor which is capable of sensing an azimuth by sensing a flow of a magnetic field. The geomagnetic sensor senses a bearing coordinate of the pointing apparatus 100, and may sense a direction where the pointing apparatus 100 is disposed based on the bearing coordinate.

The geomagnetic sensor senses geomagnetism in a manner of measuring a voltage value which is induced by the geomagnetism by using a flux-gate and the like. The geomagnetic sensor may be implemented as a two-axis sensor or a three-axis sensor. In this case, a geomagnetism output value which is calculated by each axis of the geomagnetic sensor varies depending upon a strength of circumjacent geomagnetism, and thus, normalization which maps a geomagnetism output value within a predetermined range (for example, −1 to 1) is commonly conducted. A normalization factor such as a scale value and an offset value is used in conducting the normalization. In order to calculate the normalization factor, the geomagnetic sensor must be rotated several times, the output value of the geomagnetic sensor is calculated, and maximum value and a minimum value of the output value is detected. A value which is normalized by using the normalization factor is used in an azimuth correction job.

The absolute pointing method refers to a method which maps a position of a pointing apparatus and a position of a pointer on a screen directly. The absolute pointing method may provide a more intuitive user experience. According to the absolute pointing method, when a user indicates an object on a screen by using the pointing apparatus 100, a pointer is displayed on the indicated position. In the absolute pointing method, when the pointing is started, a pointer is displayed on the first position, which provides a user with a pointing guide.

Other than the above, the controller 140 controls the overall operations of the pointing apparatus 100. The controller 140 controls to transmit a user input and the sensed position information to the input apparatus 200. The controller 140 may perform calculation to generate a corresponding control command and may control to transmit the generated control command to the input apparatus 200. In this case, the controller 140 performs some of the functions of the aforementioned controller 230 of the input apparatus 200.

When the pointing apparatus 100 supports the mode conversion, and a mode convert input is received through a mode convert button, the controller 140 coverts an input mode of the pointing apparatus 100 in response to the received mode convert input. As described above, the functions of the direction button vary when the input mode is converted. In addition, the controller 140 notifies the mode conversion to the input apparatus 200.

When the input mode of the pointing apparatus 100 is the presentation mode, and a page convert command is received through the input unit 120, the controller 140 controls to generate a control command for converting a page of a screen displayed on the input apparatus 200 and transmit the control command to the input apparatus 200.

When the input mode of the pointing apparatus 100 is the mouse mode, and a user command for controlling the input apparatus 200 is received through the input unit 120, the controller 140 may control to generate a control command for selecting an object displayed on the input apparatus 200 and transmit the control command to the input apparatus 200.

Meanwhile, when a user command is not received for a predetermined time through the input unit 120, and the changed position information on the pointing apparatus 100 is not sensed through the sensor 130, the controller 140 may convert a status of the pointing apparatus 100 to a sleep status by selectively cutting off power supply to internal components of the pointing apparatus 100.

However, when a user command is received through the input unit 120 or the changed position information on the pointing apparatus 100 is sensed through the sensor 130 in the sleep status, the controller 140 may convert the status of the pointing apparatus 100 to a wake up status by applying power to the internal components of the pointing apparatus 100, in which the power supply is cut off selectively.

Such configuration facilitates effective power control according to the status of the pointing apparatus 100, for example, a status where a user puts the pointing apparatus 100 on a table for a predetermined time without using the pointing apparatus 100, thereby saving the power.

The controller 140 controls the overall operations of the pointing apparatus 100. The controller 140 includes a hardware configuration such as a MPU, a CPU, cache memory, data bus, and the like and a software configuration such as an OS and an application which performs operations for a particular purpose. According to a system clock, a control command for each component for operating of the input apparatus 200 is read from a memory, and an electrical signal is generated according to the read control command to operate each component of the hardware.

Hereinafter, a pointing system according to another exemplary embodiment will be described.

Figure 5:
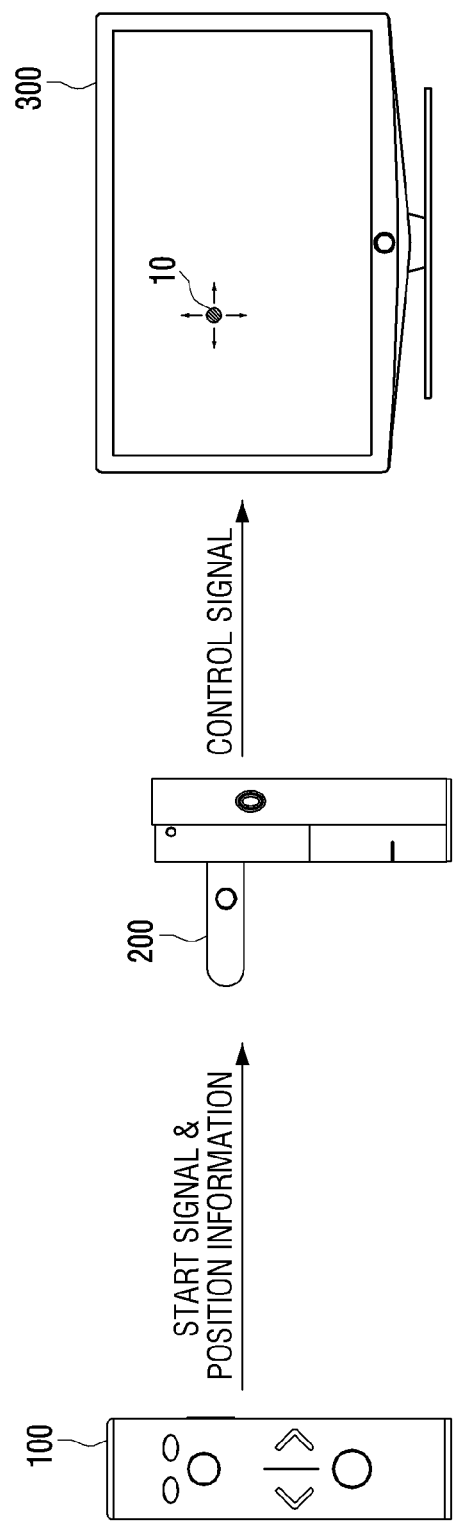
FIG. 5 is a schematic diagram of the pointing system according to another exemplary embodiment.
Figure 6:
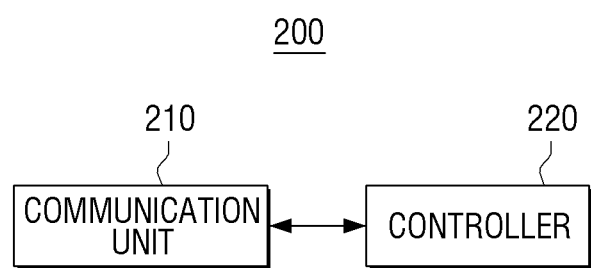
FIG. 6 is a block diagram illustrating a structure of the input apparatus in FIG. 5.

FIG. 5 is a schematic diagram of the pointing system according to another exemplary embodiment, and FIG. 6 is a block diagram illustrating a structure of the input apparatus in FIG. 5.

As illustrated in FIG. 5, the pointing system according to an exemplary embodiment includes the pointing apparatus 100, a display apparatus 300, and the input apparatus 200.

The pointing apparatus 100 receives a user input, senses movement information, and transmits the user input and the movement information to the input apparatus 200. Alternatively, the pointing apparatus 100 may generate a corresponding pointer command based on the received user input and the sensed movement information, and transmit the pointer command to the input apparatus 200. The pointing apparatus 100 has been described above. That is, the pointing apparatus 100 transmits a start signal and the position information on the pointing apparatus 100 to the input apparatus 200.

The input apparatus 200 is configured to be detachable from the display apparatus 300. Unlike the aforementioned exemplary embodiments, the input apparatus 200 does not include a display, and transmits a control signal for displaying a pointer on the display apparatus 300 to the display apparatus 300.

This system has an advantage of implementing a pointing method according to the present disclosure by simply combining the input apparatus 200 having a relatively simple configuration to the conventional display apparatus 300. For doing this, the input apparatus 200 includes a dongle which is connectable to the display apparatus 300. The dongle may be designed as a Universal Serial Bus (USB).

Unlike the exemplary embodiment above, the input apparatus 200 may be implemented to receive data only so that the display apparatus 300 performs the calculation.

As illustrated in FIG. 6, the input apparatus 200 includes a communication unit 210 and the controller 230, but does not include a display. The communication unit 210 and the controller 230 have been described in the above exemplary embodiments, and thus, the overlapped description is omitted.

Hereinafter, an additional configuration and appearance of the input apparatus 200 will be described.

Figure 7:
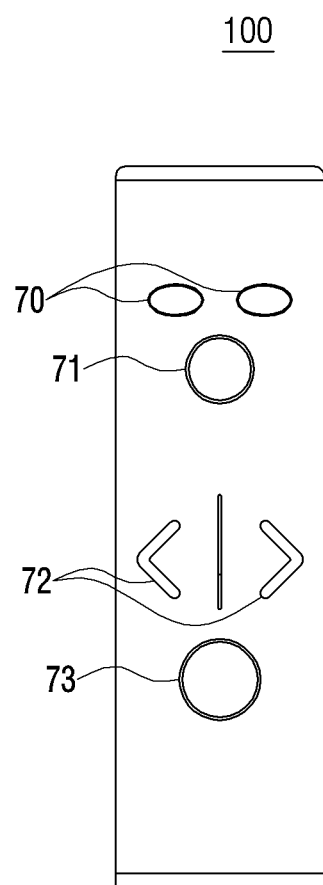
FIG. 7 is a reference view illustrating an appearance of the pointing apparatus according to various exemplary embodiments.
Figure 8:
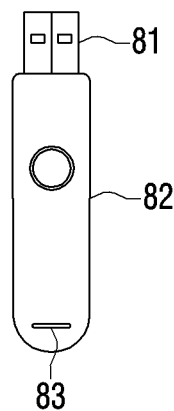
FIG. 8 is a reference view illustrating an appearance of the input apparatus according to various exemplary embodiments.

FIG. 7 is a reference view illustrating an appearance of the pointing apparatus 100 according to various exemplary embodiments, and FIG. 8 is a reference view illustrating an appearance of the input apparatus 200 according to various exemplary embodiments.

Referring to FIG. 7, the pointing apparatus 100 includes a mode select button 71, and indicator 70, a direction button 72, and a center button 73.

The mode select button 71, the direction button 72, and the center button 73 have been described above, and thus, the overlapped description is omitted.

The indicator is a configuration which displays an input mode of the pointing apparatus 100, and may be configured as a lamp which gives a light. For example, when the mode select button 71 is manipulated and the presentation mode is selected, an indicator on a left side may be turned on. When the mouse mode is selected, an indicator on a right side may be turned on.

Although not illustrated in FIG. 7, the pointing apparatus 100 may further include a storage, a power unit, etc. In this case, the pointing apparatus 100 may be configured to have the aforesaid power saving structure.

Referring to FIG. 8, the input apparatus 200 may include a port 81, a body 82, and an indicator 83.

The port 81 is a configuration for connecting the input apparatus 200 to the display apparatus 300. The port 81 may include at least one of a power supply line, a data supply line, and a control line. The input apparatus 200 transmits a control command for a pointer to the display apparatus 300 through the port 81.

The body 82 may accommodates the communication unit 210 and the controller 230 of the input apparatus 200, and if necessary, may further accommodate a storage and other circuit configurations.

The indicator 83 displays the operation status of the pointer, and may be configured as a lamp which gives a light. When a plurality of users perform the pointing input by using their own pointing apparatuses, the light color of the lamp may vary depending upon a pointing apparatus which transmits a signal.

Hereinafter, a method for displaying a pointer according to various exemplary embodiments will be described.

Figure 9:
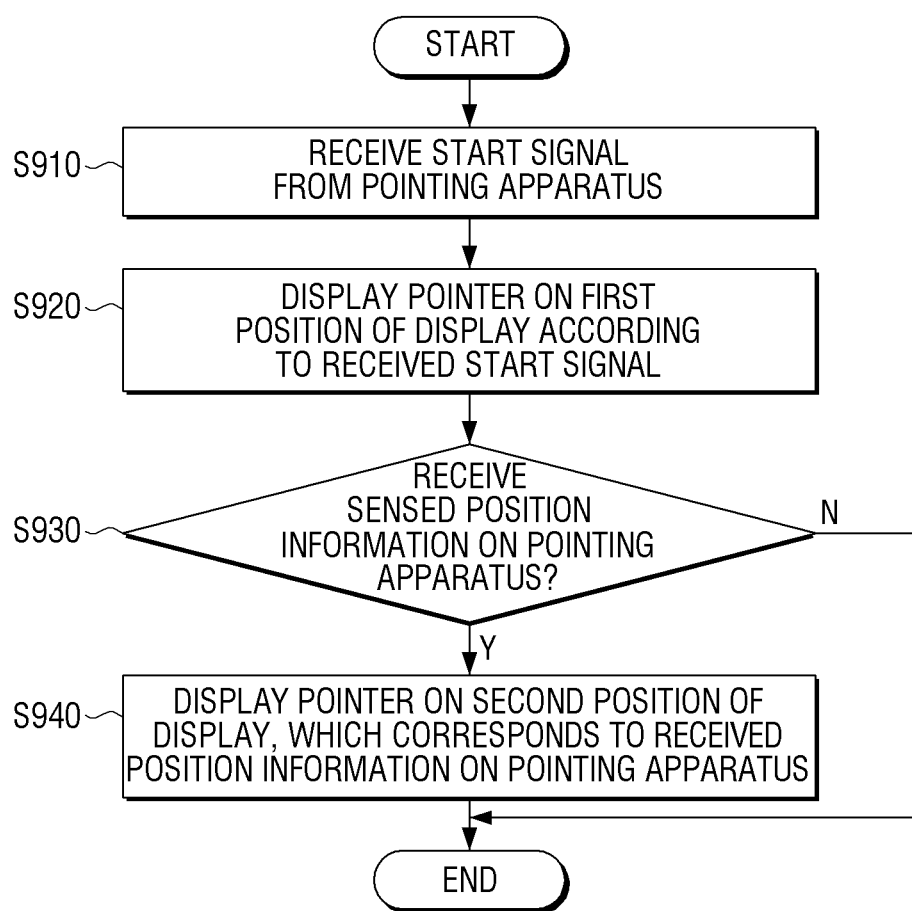
FIGS. 9 to 11 are flow charts illustrating a method for displaying a pointer according to an exemplary embodiment.
Figure 10:
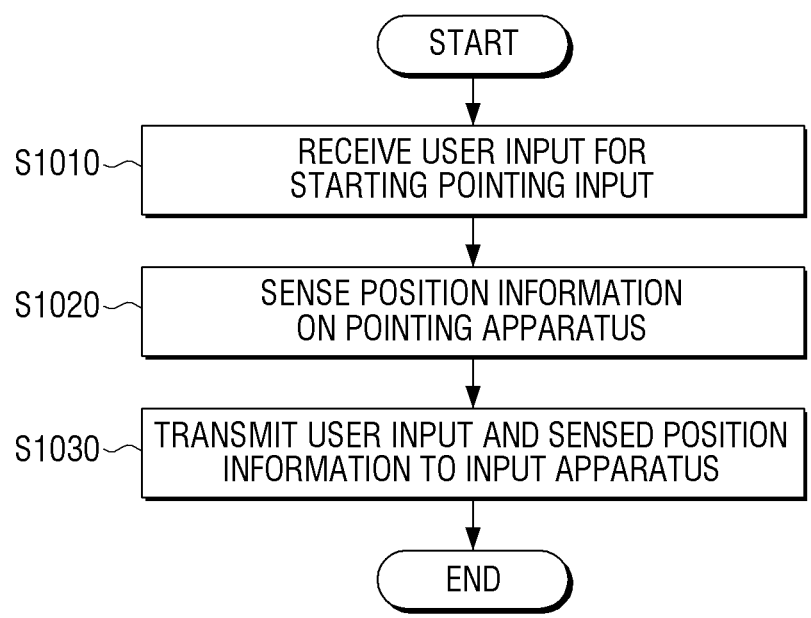
Figure 11:
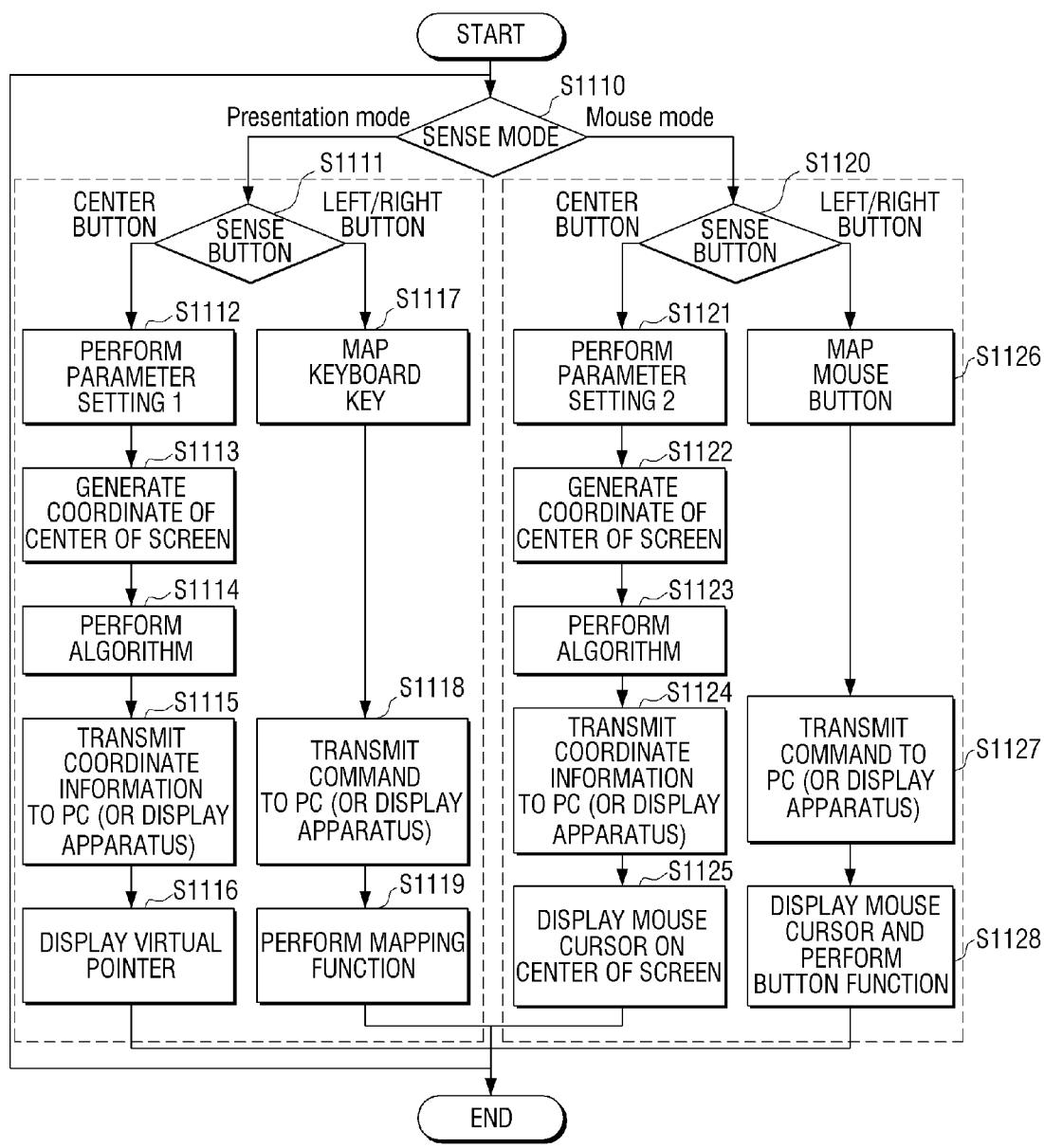

FIGS. 9 to 11 are flow charts illustrating a method for displaying a pointer according to an exemplary embodiment.

Referring to FIG. 9, the method for displaying a pointer according to an exemplary embodiment includes receiving a start signal from the pointing apparatus (S910), displaying a pointer on a first position of a display according to the received start signal (S920), and when sensed position information on the pointing apparatus is received from the pointing apparatus (S930-Y), displaying the pointer on a second position of the display, which corresponds to the received position information on the pointing apparatus (S940).

The displaying the pointer on a second position of the display (S940) may include, when the sensed position information on the pointing apparatus is received at a time when the start signal is received from the pointing apparatus, displaying the pointer on the second position of the display, which corresponds to the received position information on the pointing apparatus.

Referring to FIG. 10, the method for displaying a pointer according to another exemplary embodiment includes receiving a user input for starting a pointing input (S1010), sensing position information on the pointing apparatus when the user input is received (S1020), and transmitting the user input and the sensed position information to an input apparatus (S1030).

FIG. 11 is a flow chart illustrating a method for displaying a pointer capable of converting a mode according to another exemplary embodiment.

Referring to FIG. 11, a current mode is sensed by a mode convert input (S1110). When the converted mode is the presentation mode, a manipulation status of the center button is sensed (S1111). When it is determined that the center button was manipulated, a parameter setting is performed (S1112). Herein, the parameter refers to a parameter for setting an initial position of the pointing apparatus. In addition, a coordinate of a center of a screen where the pointer exists is generated (S1113). Subsequently, an algorithm is performed (S1114), a necessary calculation is performed by receiving the position information on the pointing apparatus, and the pointer is displayed (S1115 and S1116).

When the direction button is manipulated instead of the center button, a key corresponding to the direction button is mapped (S1117). In this case, the direction button may be mapped with various keys according to a purpose. In case of a presentation, the left direction button may be mapped with a key of converting a current page to a previous page, and the right direction button may be mapped with a key of converting the current page to a next page. Alternatively, the left direction button may be mapped with a key of moving a playback time of a moving image forward, and the right direction button may be mapped with a key of moving the playback time of the moving image backwards. When a command is transmitted to a PC or a display apparatus (S1118), the PC or the display apparatus performs a function according to the mapping (S1119).

When the mode is converted to the mouse mode, the manipulation status of the center button is sensed (S1120). When it is determined that the center button is manipulated, a parameter setting is performed (S1121). Herein, the parameter refers to a parameter for setting an initial position of the pointing apparatus. In addition, a coordinate of a center of a screen where the pointer exists is generated (S1122). Subsequently, an algorithm is performed (S1123), necessary calculation is performed by receiving the position information on the pointing apparatus, and the pointer is displayed (S1124 and S1125).

When the direction button is manipulated instead of the center button, a key corresponding to the direction button is mapped (S1126). In this case, the direction button may be mapped with various keys according to a specific purpose. The left direction button may be mapped with a left key of a mouse, and the right direction button may be mapped with a right key of the mouse. However, the left direction button and the right direction button may be mapped differently. When a command is transmitted to a PC or a display apparatus (S1127), the PC or the display apparatus performs a function according to the mapping (S1128).

Meanwhile, the aforementioned method for displaying a pointer may be stored in a non-transitory computer readable recording medium including a program for executing the method.

Herein, the non-transitory computer readable medium is not a medium that stores data for a short period, such as a register, a cache, or a memory, but means a medium which semi-permanently stores data and is readable by a device. For example, the non-transitory computer readable medium may be a compact disc (CD), a digital versatile disk (DVD), a hard disk, a Blu-ray disk, a USB, a memory card, and a read-only memory (ROM), etc.

According to the aforementioned various exemplary embodiments, the present disclosure resolves a visibility deterioration problem which may occur when a laser pointer is used in a large-scale display apparatus manufactured with LCD, PDP, OLED, etc.

In addition, the pointing apparatus of the present disclosure may provide usability that the laser pointer is used in a 3D space without any additional device by using a sensor embedded in the pointing apparatus.

In addition, it is possible to selectively use the presentation mode and the mouse mode in a single apparatus. The pointing apparatus of the present disclosure operates separately from a common PC mouse, and thus, does not cause any confusion or inconvenience in use.

In addition, the pointing apparatus of the present disclosure provides the intuitive usability which is similar to the laser pointer since it operates in accordance with the absolute pointing method.

Further, the laser pointer may cause a safety problem when the light of the laser pointer is directed at human eyes, while the pointing apparatus of the present disclosure does not result in such problem.

As given above, although a few desirable exemplary embodiments have been shown and described, the present disclosure is not limited to the aforementioned particular exemplary embodiments, and could be variously modified and achieved by those skilled in the art to which the present disclosure pertains without deviating from the substance of the present disclosure which is claimed in the claims, and such modifications should not be understood separately from the technical concept or prospect of the present disclosure.

What is claimed is:

1. An input apparatus connected to an electronic device, the input apparatus comprising:
   a communicator configured to receive a signal from a pointing apparatus; and
   a controller configured to control to display a pointer on a predetermined position of a display of the electronic device when a start signal is received from the pointing apparatus by manipulating a button on the pointing apparatus,
   wherein when sensed movement of the pointing apparatus is received from the pointing apparatus, the controller controls to display the pointer on a position of the display, which corresponds to the movement of the pointing apparatus, and
   wherein the controller is further configured to control to display another pointer on the display independently from the pointer based on a signal received from one of a mouse input apparatus and another pointing apparatus, the another pointer and the pointer being simultaneously displayed on the display.

2. The input apparatus as claimed in claim 1,
   wherein when the sensed movement of the pointing apparatus is received at a time when the start signal is received from the pointing apparatus, the controller controls to display the pointer on the position of the display, which corresponds to the movement of the pointing apparatus.

3. The input apparatus as claimed in claim 1, wherein the predetermined position is a center position of the display.

4. The input apparatus as claimed in claim 1, wherein the sensed movement of the pointing apparatus is calculated according to an absolute pointing method.

5. The input apparatus as claimed in claim 1, wherein when the pointing apparatus does not move for a predetermined time, the controller controls the pointer displayed on the display to disappear.

6. The input apparatus as claimed in claim 1, wherein the controller is arranged to receive, from the pointing apparatus, a mode convert signal which is a signal to select one of:
   a presentation mode in which the pointer is displayed as a virtual pointer and is not used to select an object displayed on the display, and
   a mouse mode in which the pointer is displayed as a mouse pointer and, when a select signal is received from the pointing apparatus while the mouse pointer is located on an object displayed on the display, the controller controls to select the object.

7. The input apparatus as claimed in claim 1, wherein the controller controls to display a plurality of pointers of a plurality of pointing apparatuses independently according to signals received from the plurality of pointing apparatuses.

8. The input apparatus as claimed in claim 7, wherein the controller controls to display the plurality of pointers distinctively from each other.

9. The input apparatus as claimed in claim 1, further comprising a display configured to display the pointer according to the received signal.

10. A pointing apparatus comprising:
    a communicator configured to communicate with an input apparatus;
    an input receiver configured to receive a user input;
    a sensor configured to sense movement of the pointing apparatus when the user input is received; and
    a controller configured to control the communicator to transmit a start signal to display a pointer on a predetermined position of a display of an electronic device connected to the input apparatus and position information to the input apparatus,
    wherein the input apparatus controls to display the pointer on a position of the display which corresponds to the sensed movement of the pointing apparatus and to display another pointer on the display independently from the pointer based on a signal received from one of a mouse input apparatus and another pointing apparatus, the another pointer and the pointer being simultaneously displayed on the display.

11. The pointing apparatus as claimed in claim 10, wherein the sensor comprises at least one from among an acceleration sensor, an angular velocity sensor, and a geomagnetic sensor to sense absolute position information on the pointing apparatus.

12. The pointing apparatus as claimed in claim 10, wherein the input receiver comprises:
    a first button configured to input a mode convert input; and
    a second button configured to control the input apparatus,
    wherein when a user command for mode convert input is received by manipulation of the first button, the controller controls to convert an input mode of the pointing apparatus to a different input mode in response to the received user command, and
    when a user command for controlling the input apparatus is received by manipulation of the second button, the controller controls to generate a control signal for controlling the input apparatus according to the different input mode and transmit the control signal.

13. The pointing apparatus as claimed in claim 12, wherein when the input mode is a presentation mode, and the user command for controlling the input apparatus is received by the manipulation of the second button, the controller controls to generate a control signal for changing a page of a displayed screen and transmit the control signal to the input apparatus.

14. The pointing apparatus as claimed in claim 12, wherein when the different input mode is a mouse mode, and the user command for controlling the input apparatus is received by the manipulation of the second button, the controller controls to generate a control signal for selecting a displayed object and transmit the control signal to the input apparatus.

15. The pointing apparatus as claimed in claim 10, wherein when a user command is not received through the input receiver for a predetermined time, and changed position information of the pointing apparatus is not sensed through the sensor, the controller converts a status of the pointing apparatus to a sleep status by selectively cutting off power supply to internal components of the pointing apparatus.

16. The pointing apparatus as claimed in claim 15, wherein when a user command is received through the input receiver or the changed position information of the pointing apparatus is sensed through the sensor in the sleep status, the controller converts a status of the pointing apparatus to a wake up status by applying power to the internal components of the pointing apparatus.

17. A method for displaying a pointer, the method comprising:
    receiving, by an input apparatus, a start signal from a pointing apparatus by manipulating a button on the pointing apparatus;
    displaying, by an input apparatus, a pointer on a predetermined position of a display according to the received start signal;
    when sensed movement of the pointing apparatus is received from the pointing apparatus, displaying, by an input apparatus, the pointer on a position of the display, which corresponds to the movement of the pointing apparatus, and
    displaying, by an input apparatus, another pointer on the display independently from the pointer based on a signal received from one of a mouse input apparatus and another pointing apparatus, the another pointer and the pointer being simultaneously displayed on the display.

18. The method as claimed in claim 17, wherein the displaying the pointer on a position of the display comprises, when the sensed movement of the pointing apparatus is received at a time when the start signal is received from the pointing apparatus, displaying the pointer on the position of the display, which corresponds to the movement of the pointing apparatus.

19. A non-transitory recordable medium including a program for executing the method for displaying a pointer as claimed in claim 17.

20. A pointing method comprising:
    receiving a user input;

sensing movement of a pointing apparatus when the user input is received; and transmitting a start signal to display a pointer on a predetermined position of a display of an input apparatus and the sensed movement to the input apparatus, wherein the input apparatus displays the pointer corresponding to the movement of the pointing apparatus and displays another pointer on the display independently from the pointer based on a signal received from one of a mouse input apparatus and another pointing apparatus, the another pointer and the pointer being simultaneously displayed on the display.

21. A system comprising:

an input apparatus; and a pointing apparatus, wherein the input apparatus comprises:

a communicator configured to receive a signal from the pointing apparatus; and a controller configured to control to display a pointer on a predetermined position of a display when a start signal is received from the pointing apparatus by manipulating a button on the pointing apparatus, and when sensed movement of the pointing apparatus is received from the pointing apparatus, the controller controls to display the pointer on a position of the display, which corresponds to the movement of the pointing apparatus, wherein the controller is further configured to control to display another pointer on the display independently from the pointer based on a signal received from one of a mouse input apparatus and another pointing apparatus, the another pointer and the pointer being simultaneously displayed on the display.

22. A system comprising:

an input apparatus; and a pointing apparatus, wherein the pointing apparatus comprises:

a communicator configured to communicate with the input apparatus;

an input receiver configured to receive a user input for starting a pointing input;

a sensor configured to sense movement of the pointing apparatus when the user input is received; and a controller configured to control the communicator to transmit a start signal to display a pointer on a predetermined position of a display of the input apparatus and the sensed movement to the input apparatus, wherein the input apparatus controls to display the pointer corresponding to the movement of the pointing apparatus, and wherein the input apparatus controls to display another pointer on the display independently from the pointer based on a signal received from one of a mouse input apparatus and another pointing apparatus, the another pointer and the pointer being simultaneously displayed on the display.

23. An input apparatus connected to an electronic device, the input apparatus comprising:

a communicator configured to receive a signal from a pointing apparatus; and in a state that a pointer is not displayed on a display of the electronic device, in response to receiving a start signal from the pointing apparatus by manipulating a button on the pointing apparatus, a controller configured to control to display the pointer on a predetermined position of the display, wherein in response to receiving a signal indicating a movement of the pointing apparatus from the pointing apparatus, the controller controls to move the pointer displayed on the predetermined position to a position corresponding to the movement of the pointing apparatus, and wherein the controller is further configured to control to display another pointer on the display independently from the pointer based on a signal received from one of a mouse input apparatus and another pointing apparatus, the another pointer and the pointer being simultaneously displayed on the display.

* * * * *